United States Patent Office 3,048,530
Patented Aug. 7, 1962

3,048,530
POLYVINYL ACETATE PAINT
Hisao Miyahara and Hideo Suzumura, Kurashiki City, Japan, assignors to Kurashiki Rayon Co., Ltd., Okayama, Japan, a corporation of Japan
No Drawing. Filed Sept. 15, 1959, Ser. No. 840,023
Claims priority, application Japan Sept. 20, 1958
7 Claims. (Cl. 204—158)

This invention relates to polyvinyl acetate paints and, more particularly, to a process for manufacturing a stabilized polyvinyl acetate paint which is extremely stable at low temperatures and may be stored over extended periods of time without danger of separating out. The invention provides an improved method for manufacturing a stabilized water-based polyvinyl acetate latex paint in which the polyvinyl acetate granules and the pigment particles are uniformly dispersed and do not manifest any noticeable tendency to separate out on prolonged standing.

The use of water-based polyvinyl acetate latex paints has become increasingly important in recent years, especially for interior painting, because of their relative inexpensiveness and the wide range of attractive and stable finishes that can be obtained. In general, these paints are manufactured by polymerizing an aqueous emulsion of vinyl acetate, using hydrogen peroxide or some other chain initiator as the polymerization catalyst, and then dispersing various pigments, extenders, plasticizers, or even other polymers, in the polyvinyl acetate emulsion to produce a concentrated latex. By way of illustration, one of the more extensively used white paints is presently manufactured by dispersing titanium oxide and zinc oxide in an aqueous emulsion of polyvinyl acetate, using chalk as an extender.

The stability of these water-based polyvinyl acetate latex paints is markedly effected by the shape and particle size of the polyvinyl acetate granules dispersed throughout the emulsion, as well as on the degree of dispersion of the hydrophilic gel which is generally added during the emulsion polymerization of vinyl acetate to stabilize the polymer system. As a general rule, polyvinyl acetate paints manufactured by initially polymerizing an aqueous emulsion of vinyl acetate using hydrogen peroxide as a catalyst, and then dispersing various pigments and extenders in resultant emulsion tend to irreversibly precipitate at temperatures of about —5° C., the precipitation of pigment particles at normal room temperatures frequently being far in excess of 1 percent by weight when the paint is stored over any extended period of time.

We have now found that by using titanium dioxide in conjunction with hydrogen peroxide in the emulsion polymerization system and by irradiating the resultant emulsion with ultraviolet light, it is possible to accelerate the rate of polymerization of the emulsified vinyl acetate and to obtain a higher degree of polymerization as well as a more uniformly dispersed polymer than can be obtained by using only hydrogen peroxide as the polymerization initiator. The emulsion polymerization products formed upon irradiating an aqueous polymerizable emulsion of vinyl acetate, hydrogen peroxide, and titanium dioxide, with ultraviolet light have ben found to be exceptionally stable, even after prolonged storage, and may be used without further processing as a polyvinyl acetate latex paint, or they may be further compounded into other water-based paints.

Based on these discoveries, the invention provides an improved process for manufacturing a stabilized polyvinyl acetate paint which comprises emulsifying vinyl acetate in an aqueous dispersion of titanium dioxide and hydrogen peroxide while irradiating the resultant emulsion with ultraviolet light preferably while maintaining its temperature between about 60° C. and 75° C., thereby polymerizing the emulsified vinyl acetate and forming a stabilized polyvinyl acetate latex paint. Polyvinyl acetate paints prepared in accordance with the process of the invention are extremely stable at temperatures as low as —15° C. and do not manifest any tendency to separate out or to undergo any noticeable precipitation upon standing. The precipitation of the pigments from these paints has been found to average less than 1 percent by weight when the paint is stored at room temperatures for periods up to six months, or even more.

As indicated previously, the rate at which the emulsified vinyl acetate polymerizes is markedly increased when titanium dioxide is employed in conjunction with hydrogen peroxide, particularly when the emulsion polymerization system is irradiated with ultraviolet light. Table I summarizes the results obtained in five separate tests in which an aqueous emulsion of vinyl acetate was polymerized using varying amounts of titanium dioxide and hydrogen peroxide, both in the presence of as well as in the absence of ultraviolet light. In each of these tests, an aqueous emulsion of 30 parts by weight of vinyl acetate, 2 parts by weight of polyvinyl alcohol, and 1 part by weight of a surfactant in water (ranging from 37 to 67 parts by weight) was prepared and then mixed with the designated amounts of hydrogen peroxide (in the form of a 30 percent aqueous solution) and titanium dioxide, the polymerizations being conducted at temperatures ranging from 63° C. to 66° C.

TABLE I

| Test No. | $TiO_2$ (parts) | $H_2O_2$ (parts) | Water (parts) | UV Applied | Polymerization Time (minutes) | Polymerization Conversion (percent) |
|---|---|---|---|---|---|---|
| 1 | None | 0.15 | 67 | No | 550 | 55 |
| 2 | None | 0.15 | 67 | Yes | 240 | 61 |
| 3 | 10 | 0.15 | 57 | Yes | 90 | 88 |
| 4 | 30 | 0.15 | 37 | No | 90 | 90 |
| 5 | 30 | 0.15 | 37 | Yes | 75 | 98 |

Analysis of the data shown in Table I indicates that the polymerization of the emulsified vinyl acetate is substantially completed in only 75 minutes when titanium dioxide is used in the emulsion polymerization system in conjunction with hydrogen peroxide while irradiating the emulsion with ultraviolet light. By way of contrast, when the polymerization was carried out using only hydrogen peroxide as the catalyst and in the absence of ultraviolet light, after a total of 550 minutes the polymerization conversion was only 55 percent.

Although the titanium dioxide and hydrogen peroxide may be employed in the emulsion polymerization system over a wide range of concentration, we generally prefer to use from 50 to 300 percent by weight of titanium dioxide and from 0.1 to 3 percent by weight of hydrogen peroxide (as a 30 percent aqueous solution), based on the weight of the vinyl acetate added to the emulsion polymerization system. The amount of water present in the polymerizable emulsion should equal from 1 to 2.5 times the weight of vinyl acetate contained in the emulsion. In addition, the emulsion polymerization system should contain from 0.5 to 8 percent by weight of a surfactant, such as the lauroyl ester of polyethylene glycol, and from 3 to 8 percent by weight of a hydrophilic gelling agent, preferably a polyvinyl alcohol having a degree of polymerization in the range from 500 to 2500, all percentages (except that designating the concentration of the hydrogen peroxide solution) being based on the weight of vinyl acetate contained in the system. Various pigments, such as copper powder or sulfur, as well as various extenders, such as chalk or lead carbonate, may also be added to the emulsion polymerization system.

To prepare the stabilized polyvinyl acetate paints of the invention, the titanium dioxide and any other pigments or extenders should first be dispersed in an aqueous solution containing a minor amount of both a surfactant (emulsifying agent) and a hydrophilic gelling agent, such as polyvinyl alcohol or partially-hydrolyzed polyvinyl acetate, and the hydrogen peroxide then added to this aqueous dispersion of titanium dioxide. Following the addition of the hydrogen peroxide to the titanium dioxide dispersion, vinyl acetate is emulsified in the dispersion while irradiating the resultant emulsion with ultraviolet light and maintaining its temperature between 60° C. and 75° C., polymerization frequently being completed in about one hour, or even less.

The following examples are illustrative of the ease with which stabilized polyvinyl acetate paints may be manufactured in accordance with the invention:

*Example I*

An aqueous dispersion of 22 parts by weight of titanium dioxide, 0.15 part by weight of an aqueous (30 percent) solution of hydrogen peroxide, 1 part by weight of lauroxypolyoxyethylene glycol, and 3 parts by weight of polyvinyl alcohol, in 39 parts by weight of water was slowly added together with 35 parts by weight of vinyl acetate to a reactor fitted with an efficient agitator and an ultraviolet light source, using vigorous agitation to form an emulsion. The temperature of the emulsion was brought to 65° C. and maintained at that temperature while the emulsion was irradiated with ultraviolet light, the polymerization being completed in about 1½ hours. The emulsion polymerization product contained only trace amounts of unreacted vinyl acetate and acetic acid.

A white pigment mixture containing a total of 20 parts by weight of chalk, clay and zinc oxide, 3 parts by weight of polyvinyl alcohol, 5 parts by weight of dibutyl phthalate, and 1 part by weight of lauroxypolyoxyethylene glycol, dispersed in 21 parts by weight of water was milled in a ball-mill for 2 hours, and was then compounded with 50 parts by weight of the emulsion polymerization product described above. The resultant latex was exceptionally stable, showing less than 1 percent precipitation upon standing for a period of six months, and could be used as polyvinyl acetate latex paint.

*Example II*

An aqueous dispersion of titanium dioxide was prepared by adding 15 parts by weight of titanium dioxide, 2 parts by weight of the lauroyl ester of polyethylene glycol, 3 parts by weight of polyvinyl alcohol (e.g., partially saponified polyvinyl acetate), 15 parts by weight of chalk, and 3 parts by weight of lead carbonate to 38 parts by weight of water, and then milling the mixture in a ball-mill. The titanium dioxide dispersion was introduced into a polymerization reactor fitted with an agitator and an ultraviolet light source, and then warmed to a temperature of 65° C., using vigorous agitation. After the titanium dioxide dispersion had been warmed to that temperature, 1.5 parts by weight of an aqueous solution (30 percent) of hydrogen peroxide were added to the warmed dispersion. Following the addition of the hydrogen peroxide, 22 parts by weight of vinyl acetate mixed with 2.2 parts by weight of dibutyl phthalate were continuously added to the reactor over a period of 2 hours. Polymerization was completed by irradiating the resultant emulsion with ultraviolet light while maintaining its temperature at 65° C. The emulsion polymerization products were exceptionally stable on standing, and could be used directly as a polyvinyl acetate latex paint.

*Example III*

An aqueous dispersion of titanium dioxide and chalk was prepared by dispersing 15 parts by weight of titanium dioxide and 20 parts by weight of chalk in 38 parts by weight of water to which 2 parts by weight of the lauroyl ester of polyethylene glycol and 2 parts by weight of the copolymer of vinyl acetate and maleic acid had previously been added. The dispersion was mixed with 1.5 parts by weight of an aqueous 30 percent solution of hydrogen peroxide and the resultant mixture was then charged to a polymerization reactor fitted with an efficient agitator and an ultraviolet light source. After the peroxide-containing dispersion had been warmed to a temperature of 65° C., a monomer solution consisting of 2 parts by weight of copal resin dissolved in 23 parts by weight of vinyl acetate was continuously added dropwise to the reactor while vigorously agitating the reactants. The resultant emulsion of vinyl acetate was polymerized by irradiating it with ultraviolet light for a period of about 2 hours while maintaining the temperature of the emulsion at 65° C. The emulsion polymerization products formed excellent water-resistant films upon coating a surface, and could be used without further processing as a white polyvinyl acetate latex paint.

We claim:

1. A process for manufacturing a stabilized polyvinyl acetate paint which comprises emulsifying vinyl acetate in an aqueous dispersion consisting essentially of water and titanium dioxide and hydrogen peroxide while irradiating the resultant emulsion with ultraviolet light, thereby polymerizing the emulsified vinyl acetate and forming a stabilized polyvinyl acetate latex paint.

2. A process for manufacturing a stabilized polyvinyl acetate paint which comprises dispersing titanium dioxide in an aqueous solution consisting essentially of water and a minor amount of both a surfactant and a hydrophilic gelling agent, adding hydrogen peroxide to the aqueous dispersion of titanium dioxide and then emulsifying vinyl acetate in said dispersion while irradiating the resultant emulsion with the ultraviolet light, thereby polymerizing the emulsified vinyl acetate and forming a stabilized polyvinyl acetate latex paint.

3. A process for manufacturing a stabilized polyvinyl acetate paint which comprises dispersing titanium dioxide in an aqueous solution consisting essentially of water and a minor amount of both a surfactant and a hydrophilic gelling agent selected from the group consisting of polyvinyl alcohol and partially hydrolyzed polyvinyl acetate, adding hydrogen peroxide to the aqueous dispersion of titanium dioxide and then emulsifying vinyl acetatae in said dispersion while irradiating the resultant emulsion with the ultraviolet light and maintaining its temperature between 60° C. and 75° C., thereby polymerizing the emulsified vinyl acetate and forming a stabilized polyvinyl acetate latex paint.

4. A process for manufacturing a stabilized polyvinyl acetate paint which comprises dispersing from 50 to 300 percent by weight of titanium dioxide in an aqueous solution consisting essentially of water and from 0.5 to 8 percent by weight of a surfactant and from 3 to 8 percent by weight of a polyvinyl alcohol having a degree of polymerization in the range from 500 to 2500, adding from 0.1 to 3 percent by weight of an aqueous 30 percent solution of hydrogen peroxide to the aqueous dispersion of titanium dioxide and then emulsifying vinyl acetate in said dispersion while irradiating the resultant emulsion with ultraviolet light and maintaining its temperature between 60° C. and 75° C., thereby polymerizing the emulsified vinyl acetate and forming a stabilized polyvinyl acetate latex paint, all percentages except that designating the concentration of the hydrogen peroxide solution being based on the weight of vinyl acetate added to the titanium dioxide dispersion.

5. A process for manufacturing a stabilized polyvinyl acetate paint which comprises dispersing from 50 to 300 percent by weight of titanium dioxide in an aqueous solution consisting essentially of water and from 0.5 to 8 percent by weight of a surfactant and from 3 to 8 percent by weight of a polyvinyl alcohol having a degree of polymerization in the range from 500 to 2500, adding from 0.1 to 3 percent by weight of an aqueous 30 percent solution of hydrogen peroxide to the aqueous dispersion of titanium dioxide and then emulsifying vinyl acetate and up to 10 percent by weight of a dialkyl phthalate plasticizer in said dispersion while irradiating the resultant emulsion with ultraviolet light and maintaining its temperature between 60° C. and 75° C., thereby polymerizing the emulsified vinyl acetate and forming a stabilized polyvinyl acetate latex paint, all percentages except that designating the concentration of the hydrogen peroxide solution being based on the weight of vinyl acetate added to the titanium dioxide dispersion.

6. A stabilized polyvinyl acetate paint prepared by the process of claim 1.

7. A stabilized polyvinyl acetate paint prepared by the process of claim 4.

References Cited in the file of this patent

UNITED STATES PATENTS

| | | |
|---|---|---|
| 1,586,803 | Herrmann et al. | June 1, 1926 |
| 2,914,495 | Gordon et al. | Nov. 24, 1959 |

FOREIGN PATENTS

| | | |
|---|---|---|
| 388,309 | Great Britain | Feb. 23, 1933 |

OTHER REFERENCES

Payne: Organic Coating Technology, vol. 1 (1954), page 523.